(12) United States Patent
Chen et al.

(10) Patent No.: US 12,368,740 B2
(45) Date of Patent: Jul. 22, 2025

(54) METHOD FOR DETERMINING RISK LEVEL OF INSTANCE ON CLOUD SERVER, AND ELECTRONIC DEVICE

(71) Applicant: BEIJING BAIDU NETCOM SCIENCE TECHNOLOGY CO., LTD., Beijing (CN)

(72) Inventors: Hao Chen, Beijing (CN); Chaoping Ji, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 306 days.

(21) Appl. No.: 17/819,779

(22) Filed: Aug. 15, 2022

(65) Prior Publication Data
US 2023/0050771 A1 Feb. 16, 2023

(30) Foreign Application Priority Data
Aug. 16, 2021 (CN) .......................... 202110937463.0

(51) Int. Cl.
*H04L 9/40* (2022.01)

(52) U.S. Cl.
CPC ........ *H04L 63/1425* (2013.01); *H04L 63/101* (2013.01); *H04L 63/20* (2013.01)

(58) Field of Classification Search
CPC . H04L 63/1425; H04L 63/1433; H04L 63/20; H04L 43/20; G06F 21/50
USPC .......................................................... 726/1
See application file for complete search history.

(56) References Cited

U.S. PATENT DOCUMENTS

| | | | |
|---|---|---|---|
| 10,148,683 B1 | 12/2018 | Lin et al. | |
| 2011/0247069 A1* | 10/2011 | Slater ................... | G06F 21/577 726/22 |
| 2014/0150100 A1* | 5/2014 | Gupta ................. | H04L 63/1425 726/22 |
| 2014/0237595 A1* | 8/2014 | Sridhara ............... | G06F 21/566 709/224 |
| 2015/0319185 A1* | 11/2015 | Kirti ................... | H04L 63/1416 726/23 |
| 2017/0063900 A1 | 3/2017 | Muddu et al. | |
| 2018/0004961 A1 | 1/2018 | Gil et al. | |

(Continued)

FOREIGN PATENT DOCUMENTS

| | | |
|---|---|---|
| CN | 102930213 A | 2/2013 |
| CN | 109861985 A | 6/2019 |

(Continued)

OTHER PUBLICATIONS book.hacktricks.xyz front page (Year: 2022).*
(Continued)

*Primary Examiner* — Sakinah White Taylor
(74) *Attorney, Agent, or Firm* — OSHA BERGMAN WATANABE & BURTON LLP

(57) ABSTRACT

A method for determining a risk level of an instance on a cloud server. The method includes: obtaining one or more monitoring items of an instance to be monitored and a rule base of each monitoring item; obtaining monitoring data corresponding to each monitoring item of the instance to be monitored; and determining a risk level of the instance to be monitored under each monitoring item based on the rule base and the monitoring data of each monitoring item.

18 Claims, 6 Drawing Sheets

(56) References Cited

U.S. PATENT DOCUMENTS

| | | | |
|---|---|---|---|
| 2018/0176244 A1* | 6/2018 | Gervais | G06F 16/1748 |
| 2018/0191760 A1 | 7/2018 | Kumar et al. | |
| 2019/0052659 A1* | 2/2019 | Weingarten | H04L 63/1441 |
| 2019/0098037 A1 | 3/2019 | Shenoy, Jr. et al. | |
| 2020/0137097 A1 | 4/2020 | Zimmermann et al. | |
| 2020/0259852 A1 | 8/2020 | Wolff et al. | |
| 2021/0258350 A1* | 8/2021 | Buck | H04L 63/0272 |
| 2022/0191230 A1* | 6/2022 | Morgan | H04L 63/20 |
| 2022/0300664 A1* | 9/2022 | Connors | H04L 63/104 |

FOREIGN PATENT DOCUMENTS

| | | |
|---|---|---|
| CN | 110855703 A | 2/2020 |
| CN | 111859400 A | 10/2020 |
| WO | 2017134758 A1 | 8/2017 |

OTHER PUBLICATIONS

Office Action issued for corresponding Chinese patent application No. 202110937463.0, mailed May 16, 2022 (12 pages).
European Search Report issued in European Application No. 22190550.8, mailed on Jan. 5, 2023 (8 pages).
Office Action issued in Japanese Application 2022-129599 mailed on Aug. 22, 2023 (16 pages).

* cited by examiner

METHOD FOR DETERMINING RISK LEVEL OF INSTANCE ON CLOUD SERVER, AND ELECTRONIC DEVICE

CROSS-REFERENCE TO RELATED APPLICATION

This application claims priority to Chinese Patent Application No. 202110937463.0 filed on Aug. 16, 2021, the disclosure of which is hereby incorporated by reference in its entirety.

FIELD

The present disclosure relates to a field of data processing, and more particularly to fields of data security and cloud platform.

BACKGROUND

With the development of cloud computing, more and more cloud products are applied to various aspects such as informatization infrastructure, management, and business. During implementation, the services provided by cloud products may be attacked, and the there is a possibility of data leakage for data of the cloud products.

In the related art, through the user's security settings for products and monitoring of each product, abnormal security can be reported, to realize risk monitoring of products for resources on the cloud. This leads to a lot of manpower consumption of risk monitoring resources, and it is hard to regularly and comprehensively obtain the safety coefficients of all products on the cloud resources.

Therefore, how to improve the timeliness and comprehensiveness of risk monitoring for products on cloud servers is a problem to be solved at present.

SUMMARY

A method for determining a risk level of an instance on a cloud server is provided. The method includes: obtaining one or more monitoring items of an instance to be monitored and a rule base of each monitoring item; obtaining monitoring data corresponding to each monitoring item of the instance to be monitored; and determining a risk level of the instance to be monitored under each monitoring item based on the rule base and the monitoring data of each monitoring item.

An electronic device is provided. The electronic device includes at least one processor; and a memory communicatively connected to the at least one processor. The memory is stored with instructions executable by the at least one processor, when the instructions are performed by the at least one processor, the at least one processor is caused to perform the method for determining a risk level of an instance on a cloud server according to the first aspect of the present disclosure.

A non-transitory computer readable storage medium stored with computer instructions is provided. The computer instructions are configured to cause a computer to perform the method for determining a risk level of an instance on a cloud server according to the first aspect of the present disclosure.

According to a fifth aspect of the present disclosure, a computer program product including a computer program is provided. When the computer program is executed by a processor, the method for determining a risk level of an instance on a cloud server according to the first aspect of the present disclosure is implemented.

It should be understood that, the content described in this part is not intended to identify key or important features of embodiments of the disclosure, nor intended to limit the scope of the disclosure. Other features of the disclosure will be easy to understand through the following specification.

BRIEF DESCRIPTION OF THE DRAWINGS

The drawings are intended to better understand the solution, and do not constitute a limitation to the disclosure.

DETAILED DESCRIPTION

The following describes the exemplary embodiments of the disclosure with reference to the accompanying drawings, which includes various details of the embodiments of the disclosure to facilitate understanding, which shall be considered merely exemplary. Therefore, those of ordinary skill in the art should recognize that various changes and modifications can be made to the embodiments described herein without departing from the scope and spirit of the disclosure. For clarity and conciseness, descriptions of well-known functions and structures are omitted in the following description.

Data processing is a technical process of analyzing and processing data, including the processing such as analysis, arrangement, calculation, editing of various original data, as well as collection, storage, retrieval, processing, transformation and transmission of data. The basic purpose of data processing is to extract and derive valuable and meaningful data for some specific people from a large amount of data that may be disorganized and difficult to understand.

Data security refers to taking necessary measures to ensure that data is in a state of effective protection and legal use, as well as an ability to ensure a continuous security state. The first is the security of the data itself, which mainly refers to active protection of data using modern cryptographic algorithms. The second is the security of data protection, mainly using modern information storage methods to actively protect data.

A cloud computing platform, also known as a cloud platform, refers to services based on hardware resources and software resources, providing computing, network and storage capabilities. Cloud computing platforms can be divided into three categories: storage-based cloud platforms mainly for data storage, computing-based cloud platforms mainly for data processing, and comprehensive cloud computing platforms that take into account both computing and data storage and processing.

Figure 1:
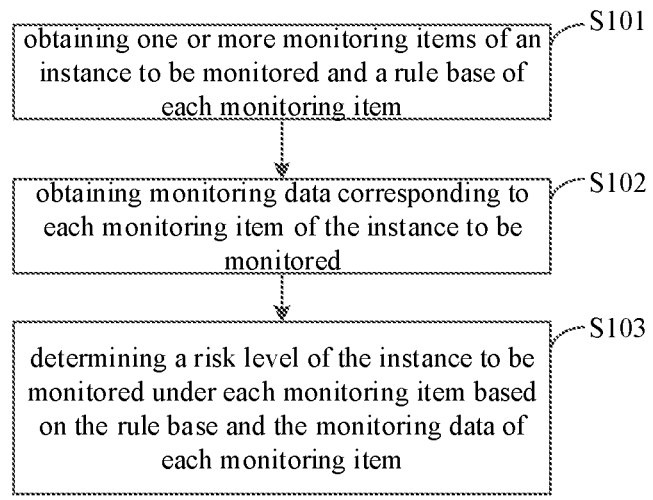
FIG. 1 is a flowchart illustrating a method for determining a risk level of an instance on a cloud server according to an embodiment of the present disclosure.

FIG. 1 is a flowchart illustrating a method for determining a risk level of an instance on a cloud server according to an embodiment of the present disclosure. As illustrated in FIG. 1, the method includes following steps.

S101, one or more monitoring items of an instance to be monitored and a rule base of each monitoring item are obtained.

In an implementation, a client can realize its own functions through services provided by an instance on a cloud server. Therefore, monitoring operations may be performed on data security of the instance on the cloud server.

In some embodiments of the present disclosure, an instance to be monitored on which risk monitoring may be performed exists on the cloud server. One or more risk monitoring items can be set for the instance to be monitored. Risk levels of the relevant settings of the instance to be monitored may be determined according to information corresponding to the content of the one or more risk monitoring items in the instance to be monitored.

Further, corresponding monitoring standards can be set for each monitoring item. That is, a standard of safety operations and a risk determination standard of non-safety operations of any instance under each monitoring item are determined as the monitoring standard of a corresponding monitoring item. A rule base corresponding to each monitoring item is established according to the monitoring standards of each monitoring item, and the rule base corresponding to each monitoring item can be determined as a target rule base of each monitoring item.

It should be noted that, under each monitoring item, the instance to be monitored has a separate target rule base. That is, the target rule bases of different monitoring items of different instances to be monitored exist independently.

S102, monitoring data corresponding to each monitoring item of the instance to be monitored is obtained.

During a process of providing services by the instance to be monitored, relevant operation data can be recorded, and the relevant operation data recorded can be determined as monitoring data of the instance to be monitored. Further, the monitoring data corresponding to each monitoring item can be obtained from the monitoring data of the instance to be monitored. The monitoring data corresponding to each monitoring item can be called as target monitoring data corresponding to each monitoring item below to distinguish from other monitoring data.

Optionally, an operation log of the instance to be monitored may be obtained. The operation log may include monitored and recorded operation types and corresponding operation data of the instance to be monitored. Further, a keyword can be set for each monitoring item, and an operation type including the keyword is selected from the operation types based on the keyword. The operation type including the keyword and each piece of operation data corresponding to the operation type including the keyword are determined as the monitoring data corresponding to each monitoring item.

The monitoring data corresponding to each monitoring item may include an operation type, an operation time point, specific operation data, etc. of the instance to be monitored.

S103, a risk level of the instance to be monitored under each monitoring item is determined based on the rule base and the monitoring data of each monitoring item.

In some embodiments of the present disclosure, the risk level of the instance to be monitored may be determined based on different monitoring items. Each monitoring item has a corresponding target rule base. Therefore, the monitoring data corresponding to each monitoring item can be compared with the rules in the rule base of the corresponding monitoring item, and the risk level of the instance to be monitored under each monitoring item is determined based on the comparison result.

For example, the one or more monitoring items include a login monitoring item. After login monitoring data within a time range of the instance to be monitored, operation information can be obtained from the login monitoring data. Further, a risk level of the instance to be monitored under the login monitoring item is determined according to rules in a target rule base corresponding to the login monitoring item.

Further, different risk levels can be set for the instance to be monitored according to a degree of security impact of different operations on the instance to be monitored. For example, a risk level in a risk-free scenario can be set to normal. For another example, a risk level in a scenario of an abnormal operation that does not affect the running of the instance to be monitored may be set as warning. For another example, a risk level in a scenario of an abnormal operation affecting the running of the instance to be monitored may be set as high risk.

For example, if all login data of the instance to be monitored in the obtained monitoring data corresponding to the login monitoring item conforms to rules corresponding to a security standard operation, it can be determined that the current instance to be monitored is risk-free under the login monitoring item, and the corresponding risk level may be determined to be normal.

For example, if there is an abnormal login operation about the instance to be monitored in the obtained monitoring data corresponding to the login monitoring item, the risk level of the current instance to be monitored under the login monitoring item can be determined as warning or high risk according to the degree of influence of the abnormal login.

In an implementation, the server can perform autonomous risk monitoring on the instance to be monitored based on a certain frequency, so that the risk monitoring of the instances on the cloud server can realize the optimization of timeliness.

With the method for determining a risk level of an instance on a cloud server according to embodiments of the present disclosure, the one or more monitoring items of the instance to be monitored and the rule base corresponding to each monitoring item are obtained, and the monitoring of the instance to be monitored under each monitoring item is obtained, then, the risk level of the instance to be monitored under each monitoring item is determined according to the monitoring data and the rule base under each monitoring item. In the present disclosure, the risk monitoring can be performed on the instances on the cloud server based on a set frequency, which realizes autonomous risk monitoring on the instances on the cloud server, strengthens the timeliness of the risk monitoring. In addition, by setting multiple monitoring items and obtaining the risk level of the instance to be monitored under each monitoring item, the comprehensiveness of risk monitoring for the instances on the cloud server is optimized.

Figure 2:
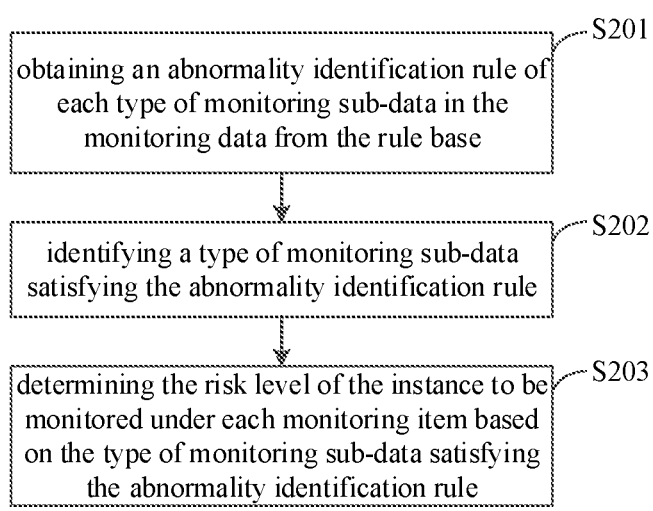
FIG. 2 is a flowchart illustrating a method for determining a risk level of an instance on a cloud server according to an embodiment of the present disclosure.

In the above embodiments, the determination of the risk level can be further described with reference to FIG. 2. FIG. 2 is a flowchart illustrating a method for determining a risk level of an instance on a cloud server according to an embodiment of the present disclosure. As illustrated in FIG. 2, the method includes following steps.

S201, an abnormality identification rule of each type of monitoring sub-data in the monitoring data is obtained from the rule base.

In an implementation, each monitoring item of the instance to be monitored can contain different types of monitoring content, which can be identified as sub-monitoring items under each monitoring item. A risk level of the instance to be monitored under a monitoring item may be determined based on a risk level of each sub-monitoring item under the monitoring item.

Further, monitoring data corresponding to a sub-monitoring item in the target monitoring data corresponding to the instances to be monitored under each monitoring item can be determined as the monitoring sub-data of the sub-monitoring item based on the sub-monitoring items under each monitoring item. The target monitoring data may include multiple types of monitoring sub-data.

In order to implement the determination of a risk level of each type of monitoring sub-data, a risk determination rule corresponding to each type of monitoring sub-data may be obtained from the target rule base corresponding to each monitoring item based on each type of monitoring sub-data, and the risk determination rule corresponding to each type of monitoring sub-data is determined as the abnormality identification rule corresponding to each type of monitoring sub-data.

Optionally, the target rule base corresponding to each monitoring item of the instance to be monitored can be predefined and can be stored in a set location of the server. When monitoring the risk level, the target rule can be acquired and loaded from the set storage location for storage. The target rule base corresponding to the instance to be monitored under each monitoring item can be loaded respectively according to the different monitoring items of the instance to be monitored, and then the abnormality identification rule of each type of monitoring sub-data is obtained from the target rule base corresponding to each monitoring item.

S202, a type of monitoring sub-data satisfying the abnormality identification rule is identified.

After determining the abnormality identification rule corresponding to each type of monitoring sub-data, the monitoring sub-data that satisfies the corresponding abnormality identification rule can be identified from each type of monitoring sub-data. By determining a risk level of this part of monitoring sub-data, i.e., the monitoring sub-data satisfying the corresponding abnormality identification rule, the determination of the risk level of the instance to be monitored under each monitoring item is realized.

Optionally, at least one keyword can be set for an operation type and a corresponding risk level determination rule in the abnormality identification rule, and operation monitoring data corresponding to each keyword can be extracted from the target monitoring data according to the keywords, and the extracted operation monitoring data is determined as the monitoring sub-data that satisfies the corresponding abnormality identification rule.

For example, if the login monitoring data under the login monitoring item of the instance to be monitored is set to include login address monitoring data, login time monitoring data, and login frequency monitoring data, the login address monitoring data, the login time monitoring data, and the login frequency monitoring data are determined as multiple types of monitoring sub-data of the login monitoring data.

Further, if the abnormality identification rule corresponding to the login address monitoring data include an abnormality identification rule corresponding to a remote login, monitoring data of the remote login can be selected from the login address monitoring sub-data and can be determined as the monitoring sub-data that satisfies the abnormality identification rule.

S203, the risk level of the instance to be monitored under each monitoring item is determined based on the type of monitoring sub-data satisfying the abnormality identification rule.

In some embodiments of the present disclosure, the abnormality identification rule corresponding to each type of monitoring sub-data includes a risk determination standard of the corresponding monitoring sub-data. Therefore, the monitoring sub-data can be compared with its corresponding abnormality identification rule to determine an abnormality identification rule satisfied by the monitoring sub-data, and a risk level corresponding to the abnormality identification rule is regarded as the risk level corresponding to the monitoring sub-data.

Further, determine a risk level of each type of monitoring sub-data in the target monitoring data corresponding to each monitoring item of the instance to be monitored, and then the risk level corresponding to the instance to be monitored under each monitoring item is determined.

For example, the login monitoring item includes a login address sub-monitoring item and a login frequency sub-monitoring item. The login address monitoring sub-data and the login frequency monitoring sub-data can be obtained from the login monitoring data. Monitoring sub-data that satisfies an abnormality identification rule corresponding to the login address sub-monitoring item is selected from the login address monitoring sub-data based on the abnormality identification rule corresponding to the login address sub-monitoring item, and then a risk level corresponding to the selected monitoring sub-data is determined.

Further, after determining the risk levels of the sub-monitoring items under each login monitoring item, a risk level of the instance to be monitored under the login monitoring item is determined based on the risk level corresponding to each sub-monitoring item.

With the method for determining a risk level of an instance on a cloud server according to the present disclosure, the abnormality identification rules corresponding to different types of the monitoring sub-data are respectively determined from the target rule base according to the different types, the risk level of each monitoring sub-data is determined according to the abnormality identification rule, and then the risk level of the instance to be monitored under each monitoring item is determined. In the present disclosure, multiple monitoring items are set and the risk level of the instance to be monitored under each monitoring item is obtained, which optimizes the comprehensiveness of risk monitoring for instances on the cloud server.

In an implementation, the monitoring items of the instance to be monitored can be preset. Optionally, the risk monitoring of the instance to be monitored can be performed from the aspects of login security, authority setting security, and plug-in setting security. The login monitoring item of the instance to be monitored can be generated based on the risk monitoring of the login security, an authority monitoring item of the instance to be monitored can be generated based on the risk monitoring of the authority setting security, and a plug-in monitoring term of the instance to be monitored can be generated based on the risk monitoring of the plug-in setting security.

Optionally, different risk levels may be set based on different risk degrees, such as a first risk level and a second risk level. The first risk level is higher than the second risk level.

Therefore, the first risk level can be set as high risk, and the second risk level can be set as warning.

Figure 3:
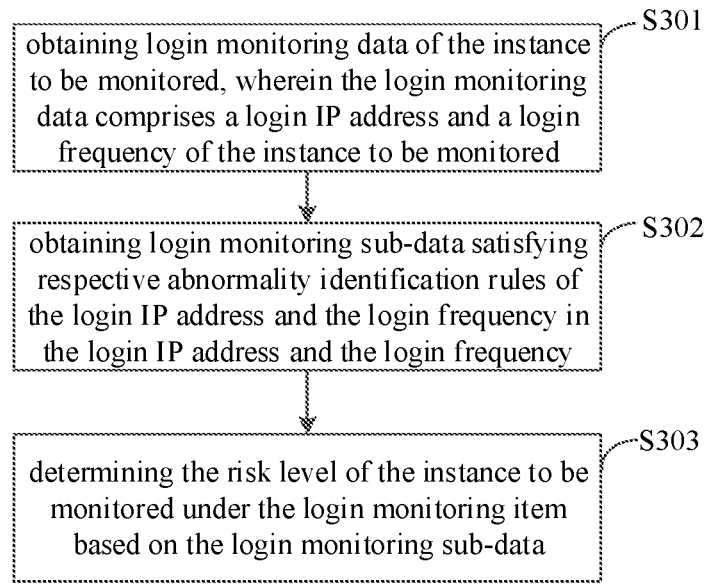
FIG. 3 is a flowchart illustrating a method for determining a risk level of an instance on a cloud server according to an embodiment of the present disclosure.

Further, the determination of a risk level of the instance to be monitored under a login monitoring item can be further described with reference to FIG. 3. FIG. 3 is a flowchart illustrating a method for determining a risk level of an instance on a cloud server according to an embodiment of the present disclosure. As illustrated in F FIG. 3, the method includes the following steps.

S301, login monitoring data of the instance to be monitored is obtained, the login monitoring data includes a login IP address and a login frequency of the instance to be monitored.

In some embodiments of the present disclosure, for the login risk monitoring of the instance to be monitored, the corresponding login monitoring items may include a login IP address sub-monitoring item and a login frequency sub-monitoring item.

The login IP address sub-monitoring item is a monitoring item of the risk monitoring performed on a login IP address of the instance to be monitored. The login frequency sub-monitoring item is a monitoring item of the risk monitoring performed on a login frequency of the instance to be monitored.

The operation data related to the login monitoring items can be obtained from recorded operation data of the instance to be monitored, and can be determined as the login monitoring data of the instance to be monitored under the login monitoring item.

Monitoring sub-data corresponding to the login IP address sub-monitoring item and the login frequency sub-monitoring item can be respectively obtained from the target monitoring data of the instance to be monitored corresponding to the login monitoring item based on the login IP address sub-monitoring item and the login frequency sub-monitoring item under the login monitoring item.

Optionally, the monitoring sub-data corresponding to the login IP address sub-monitoring item may be an address that a login IP for logging in the instance to be monitored within a set time range belongs to, and the monitoring sub-data corresponding to the login frequency sub-monitoring item may be a login frequency of the instance to be monitored within the set time range. The login frequency is determined based on each time point of logging in the instance to be monitored.

It should be noted that the time range that the login monitoring data belongs to can be set based on the user's needs for risk monitoring of the instance to be monitored. For example, the time range may be set as one week or two weeks, which is not limited here.

S302, login monitoring sub-data satisfying respective abnormality identification rules of the login IP address and the login frequency is obtained in the login IP address and the login frequency.

In some embodiments of the present disclosure, the abnormality login identification rules respectively corresponding to the login IP address sub-monitoring item and the login frequency sub-monitoring item may be obtained from the target rule base corresponding to the instance to be monitored under the login monitoring item. That is, first login monitoring sub-data satisfying an abnormality identification rule of a login-IP-address type in the login IP address is obtained, and second login monitoring sub-data satisfying an abnormality identification rule of a login-frequency type in the login frequency is obtained. For example, the abnormality login identification rule corresponding to the login IP address sub-monitoring item may include a remote login identification rule. For example, the abnormality login identification rule corresponding to the login frequency sub-monitoring item may include a high-frequency brute-force login identification rule.

Monitoring sub-data satisfying the abnormality login identification rule corresponding to the login IP address sub-monitoring item is identified from the monitoring sub-data corresponding to the login IP address sub-monitoring item based on the abnormality login identification rule corresponding to the login IP address sub-monitoring item. For example, abnormal login data that does not match a historical secure login IP address is selected from login IP address data of the instance to be monitored within a set time range. The abnormal login data is the monitoring sub-data that satisfies the abnormality login identification rule corresponding to the login IP address sub-monitoring item.

Correspondingly, monitoring sub-data that satisfies the abnormality login identification rule corresponding to the login frequency sub-monitoring item is identified from the monitoring sub-data corresponding to the login frequency sub-monitoring item based on the abnormality login identification rule corresponding to the login frequency sub-monitoring item. For example, data of abnormally high-frequency login that does not match a historical secure login frequency is selected from login frequency data of the instance to be monitored within a set time range. The data of abnormally high-frequency login is the monitoring sub-data that satisfies the abnormality login identification rule corresponding to the login frequency sub-monitoring item.

The monitoring sub-data corresponding to each sub-monitoring item is integrated to obtain the login monitoring sub-data under the login monitoring item that satisfies the abnormality login identification rule under each sub-monitoring item.

S303, the risk level of the instance to be monitored under the login monitoring item is determined based on the login monitoring sub-data.

In some embodiments of the present disclosure, after obtaining the login monitoring sub-data that satisfies the abnormality login identification rules in the login monitoring data of the instance to be monitored under the login monitoring item, risk level determination can be performed on the login monitoring sub-data that satisfies the abnormality login identification rules based on the determination rule of the risk level in the abnormality login identification rules, and then the risk level of the instance to be monitored under the login monitoring item is obtained.

Further, the login monitoring sub-data of the login IP address sub-monitoring item can be compared with its corresponding abnormality login identification rule.

In response to the login IP address containing a login IP address different from a historical secure login IP address, the risk level under the login monitoring item is determined as the first risk level.

In some embodiments of the present disclosure, the server may obtain the historical secure login IP address of the instance to be monitored based on historical login data of the instance to be monitored. In an implementation, a host login IP address of the instance to be monitored is often fixed. Therefore, when there is an abnormal login IP address different from the historical secure login IP address in the monitoring sub-data corresponding to the login IP address sub-monitoring item, it can be determined that a remote login occurred on the instance to be monitored. Then, the risk level of the instance to be monitored under the login IP address monitoring item is determined as the first risk level based on the setting of the risk level of the remote login in the abnormality login identification rule.

Further, the login monitoring sub-data of the login frequency sub-monitoring item can be compared with its corresponding abnormality login identification rule.

In response to the login frequency being greater than or equal to a frequency threshold, and in response to a successful login, the risk level under the login monitoring item is determined to be the first risk level; or, in response to the login frequency being greater than or equal to the frequency threshold, and in response to a failed login, the risk level under the login monitoring item is determined to be the second risk level.

In some embodiments of the present disclosure, an instance on the cloud server may have a high-frequency brute-force login. The brute-force login can be understood as login operations performed frequently in a short period of time. Optionally, the brute-force login may occur due to brute-force attack on a login password. Therefore, security detection may be performed on the login frequency of the instance to be monitored.

Optionally, a frequency threshold can be preset, and when a login frequency in the monitoring sub-data corresponding to the instance to be monitored under the logging frequency sub-monitoring item is greater than or equal to the frequency threshold, it can be determined that the current instance to be monitored may have a brute-force login.

Further, based on a result of brute-force login, the risk level of the instance to be monitored under the login frequency sub-monitoring item can be determined.

When the brute-force login is successful, it can be understood that the current login password of the instance to be monitored is successfully cracked by brute force. In this scenario, the instance to be monitored has a greater risk. Therefore, a risk level corresponding to the situation where the login frequency is greater than or equal to the frequency threshold of and the login is successful can be determined as the first risk level which is relatively high.

Correspondingly, when the brute-force login fails, it can be understood that the current login password of the instance to be monitored fails to be cracked. Therefore, the risk level corresponding to the case where the login frequency is greater than or equal to the set frequency threshold but the login fails may be determined as the second risk level.

Further, the setting of different risk levels can enable a user to take different countermeasures based on different risk levels.

Further, the risk level of the instance to be monitored under the login IP address sub-monitoring item can be integrated with the risk level under the login frequency sub-monitoring item, thereby the risk level of the instance to be monitored under the login monitoring item is generated.

With the method for determining a risk level of an instance on a cloud server according to embodiments of the disclosure, by determining the risk level of the instance to be monitored under the login IP address monitoring item and the risk level of the instance to be monitored under the login frequency monitoring item, both of which are under the login monitoring item, the risk level of the instance to be monitored under the login frequency monitoring item can be determined. Through the autonomous risk monitoring of the instance on the cloud server, the risk level of the instance under the login monitoring item is determined, which optimizes the timeliness of risk level acquisition and the comprehensiveness of risk level acquisition of the instance.

Figure 4:
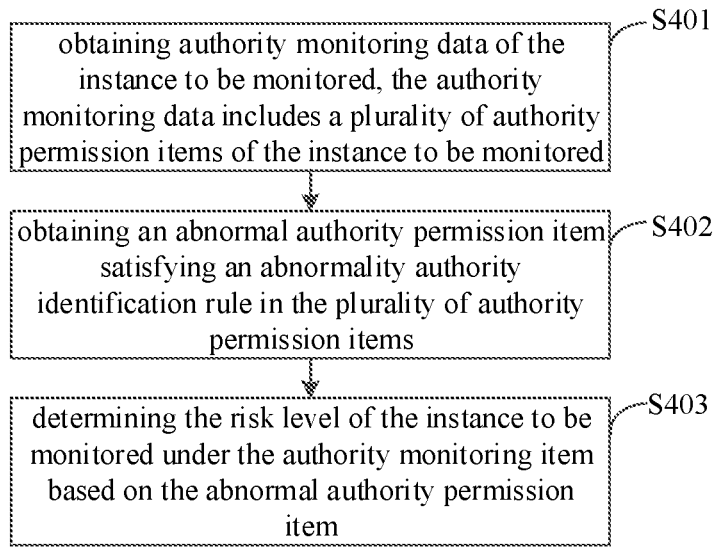
FIG. 4 a flowchart illustrating a method for determining a risk level of an instance on a cloud server according to an embodiment of the present disclosure.

In some embodiments, the determination of a risk level of the instance to be monitored under an authority monitoring item can be further described with reference to FIG. 4. FIG. 4 a flowchart illustrating a method for determining a risk level of an instance on a cloud server according to an embodiment of the present disclosure. As illustrated in FIG. 4, the method includes following steps.

S401, authority monitoring data of the instance to be monitored is obtained, the authority monitoring data includes a plurality of authority permission items of the instance to be monitored.

In some embodiments of the present disclosure, authority setting of the instance to be monitored has a corresponding authority monitoring item, and the monitoring data of the instance to be monitored under the authority monitoring item can be obtained from recorded operation data of the instance to be monitored. The authority monitoring data may be authority permission data of the instance to be monitored, including multiple authority permission items of the current instance to be monitored.

S402, an abnormal authority permission item satisfying an abnormality authority identification rule is obtained in the plurality of authority permission items.

In some embodiments of the present disclosure, the abnormality authority identification rule corresponding to the plurality of authority permission items may be obtained from a target rule base corresponding to the authority monitoring items of the instance to be monitored. The abnormality authority identification rules may include identification rules for abnormal authority permission.

Optionally, historical secure authority permission items of the instance to be monitored is obtained from historical monitoring data of the instance to be monitored. An abnormal authority permission item that is outside the set of the historical secure authority permission items is obtained from the authority monitoring data, and is determined as the abnormal authority permission item that satisfies the abnormality authority identification rule.

For example, the historical authority opening scope of the instance to be monitored includes authority A, authority B, and authority C, i.e., the historical secure authority permission items. Multiple authority permission items of the instance to be monitored include authority A, authority D, and authority E. Then it is determined, based on the abnormality authority identification rule corresponding the authority monitoring item, that the authority D and the authority E are the abnormal authority permission items.

S403, the risk level of the instance to be monitored under the authority monitoring item is determined based on the abnormal authority permission item.

In some embodiments of the present disclosure, based on in a rule for determining a risk level of the abnormal authority permission item in the abnormality authority identification rule, the risk level of the abnormal authority permission item can be determined, and then the risk level of the instance to be monitored under the authority monitoring item can determined.

In an implementation, the instance to be monitored has secure authority permission data. That is, in a scenario where the authority in the data is permitted, the information security of the instance to be monitored may not be affected. The secure authority permission item data can be determined as an authority setting whitelist of the instance to be monitored.

Further, in response to the abnormal authority permission item not existing in the authority setting whitelist, the risk level under the authority monitoring item is determined to be the first risk level.

The abnormal authority permission item that satisfies the abnormality authority identification rule can be compared with the authority setting whitelist. If the abnormal authority permission item does not belong to the authority setting whitelist, it can be determined that the current abnormal authority permission item is not in the permitted range of the secure authority permission of the instance to be monitored. Therefore, its corresponding risk level can be determined as the first risk level, which is relatively high.

Further, in response to the abnormal authority permission item existing in the authority setting whitelist, the risk level under the authority monitoring item is determined to be the second risk level.

The abnormal authority permission item can be compared with the authority setting whitelist. If the abnormal authority permission item belongs to the authority setting whitelist, it can be determined that the abnormal authority permission item does not belong to the historical secure authority permission items, but its activation may not affect the information security of the instance to be monitored, so it can be determined that the risk level of the instance to be monitored under the authority monitoring item is the second risk level.

Further, in response to the abnormal authority permission item existing in the authority setting whitelist, and the number of the abnormal authority permission item is being greater than or equal to a number threshold, it is determined that the risk level under the authority monitoring item is the second risk level.

In some embodiments of the present disclosure, the authority permission item of the instance to be monitored may have a preset number threshold, and the number threshold can be understood as, under a scenario of daily operation, the number of historical secure permission items allowed by the instance to be monitored. Therefore, risk monitoring can be performed on the authority settings of the instance to be monitored based on the number threshold.

When the number of the abnormal authority permission items is greater than or equal to the number threshold, it can be understood that the instance to be monitored may have a situation where its authority is transitionally enabled, then further determination may be performed on the abnormal authority that is transitionally enabled to determine a risk level corresponding to the current scenario.

As a possible implementation, when the abnormal authority permission items that are transitionally enabled contains an authority permission item that does not belong to the authority setting whitelist, it can be known, based on the details of the above embodiments, that the risk level corresponding to this scenario is the first risk level, which is higher than the second risk level.

As another possible implementation, when the abnormal authority permission items that are transitionally enabled all belong to the authority setting whitelist, it can be determined that the risk level corresponding to the current scenario is the second risk level.

With the method for determining a risk level of an instance on a cloud server according to embodiments of the present disclosure, the risk levels are determined for different situations corresponding to the authority monitoring item, thereby realizing the determination of the risk level of the instance to be monitored under the authority monitoring item. Through the autonomous risk monitoring of the instances on the cloud server, the risk level of the instance under the authority monitoring item is determined, which optimizes the timeliness of risk level acquisition and the comprehensiveness of risk level acquisition of the instances.

Figure 5:
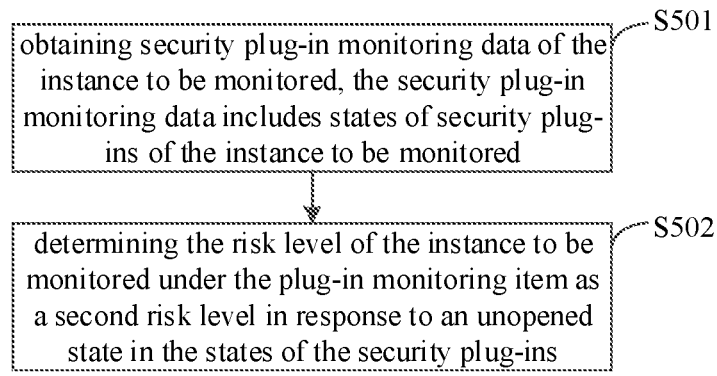
FIG. 5 is a flowchart illustrating a method for determining a risk level of an instance on a cloud server according to an embodiment of the present disclosure.

In some embodiments, the determination of a risk level of the instance to be monitored under a plug-in monitoring item can be further described with reference to FIG. 5. FIG. 5 is a flowchart illustrating a method for determining a risk level of an instance on a cloud server according to an embodiment of the present disclosure. As illustrated in FIG. 5, the method includes following steps.

S501, security plug-in monitoring data of the instance to be monitored is obtained, the security plug-in monitoring data includes states of security plug-ins of the instance to be monitored.

In some embodiments of the present disclosure, enabling the security plug-in of the instance to be monitored can protect the information security of the instance to be monitored, such as realizing the secure transmission of information, or realizing the secure interception of attacks.

Therefore, when risk monitoring of the security plug-in may be performed on the instance to be monitored, a plug-in monitoring item can be set for the instance to be monitored.

Further, from recorded operation data of the instance to be monitored, the security plug-in monitoring data of the instance to be monitored under the plug-in monitoring item can be obtained. The security plug-in monitoring data includes the state data of the security plug-ins of the instance to be monitored, For example, data related to whether a security plug-in is enabled, and so on.

S502, the risk level of the instance to be monitored under the plug-in monitoring item is determined as a second risk level in response to an unopened state in the states of the security plug-ins.

The risk level determination may be performed based on the open state of each security plug-in in the instance to be monitored. When a security plug-in is not enabled, i.e., not opened, although the instance to be monitored can run normally, there may be potential security risks such as data leakage or being attacked. Therefore, the risk level corresponding to this scenario can be determined as the second risk level.

For example, the instance to be monitored has a secure transmission protocol, and by acquiring the state of each security plug-in in the security plug-in monitoring data corresponding to the instance to be monitored, it can be known that the secure transmission protocol is not enabled, i.e., unopened. Further, the enabled state of the secure transmission protocol does not affect the normal operation of the instance to be monitored, while the instance to be monitored has a risk that data may be leaked.

Therefore, the risk level of the instance to be monitored under the plug-in monitoring item can be determined as the second risk level.

For an example, the instance to be monitored has a security component, and by obtaining the state of each security plug-in in the security plug-in monitoring data corresponding to the instance to be monitored, it can be known that the security component is not enabled by the instance to be monitored. Further, the enabling of the security component does not affect the normal operation of the instance to be monitored, but the current instance to be monitored may be at risk of being attacked.

Therefore, the risk level of the instance to be monitored under the plug-in monitoring item can be determined as the second risk level.

With the method for determining a risk level of an instance on a cloud server according to embodiments of the present disclosure, the risk level of the instance to be monitored under the plug-in monitoring item is determined based on the states of the security plug-ins. Through the autonomous risk monitoring of instances on the cloud server, the risk level of the instance under the plug-in monitoring item is determined, which optimizes the timeliness of risk level acquisition and the comprehensiveness of risk level acquisition of the instances.

Figure 6:
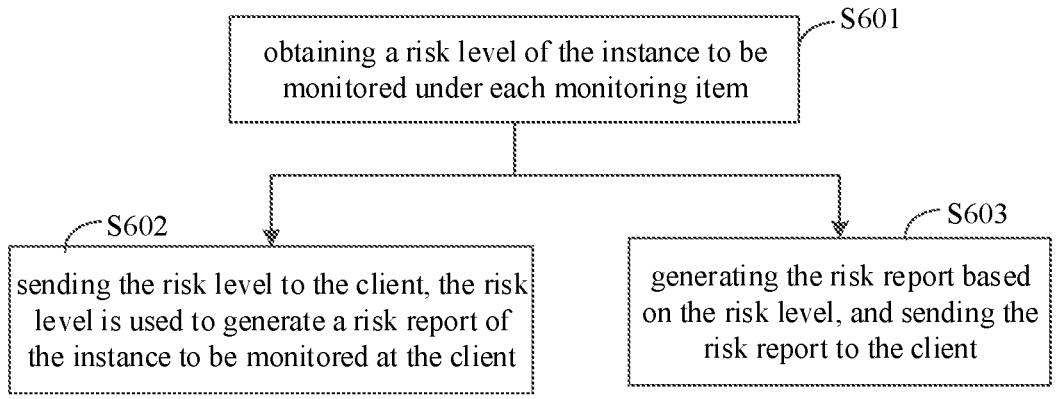
FIG. 6 is a flowchart illustrating a method for determining a risk level of an instance on a cloud server according to an embodiment of the present disclosure.

Based on the above embodiments, after determining the risk level of the instance to be monitored under each monitoring item, the method can be further described with reference to FIG. 6. FIG. 6 is a flowchart illustrating a method for determining a risk level of an instance on a cloud server according to an embodiment of the present disclosure. As illustrated in FIG. 6, the method includes following steps.

S601, a risk level of an instance to be monitored under each monitoring item is obtained.

In some embodiments of the disclosure, the risk level of the instance to be monitored under each monitoring item is obtained according to the different monitoring items of the instance to be monitored. After obtaining each risk level, a corresponding risk report can be generated based on the risk level of the instance to be monitored under each monitoring item.

As a possible implementation, the risk report can be generated by a client.

S602, the risk level is sent to the client, the risk level is used to generate the risk report of the instance to be monitored at the client.

In some embodiments of the present disclosure, after the risk level of the instance to be monitored under each monitoring item is obtained, the server may send the risk level to the corresponding client, and the client may generate the risk report.

Optionally, the risk report may include the risk levels of all the instances to be monitored under each monitoring item. For an instance to be monitored that meets a safety operation standards and has no risk, a no-risk identification, such as normal, may be marked under each monitoring item.

As another possible implementation, the risk report can be generated by the server.

S603, the risk report is generated based on the risk level, and the risk report is sent to the client.

In some embodiments of the present disclosure, after the server obtains the risk level of the instance to be monitored under each monitoring item, the server can directly generate the corresponding risk report, and can send the generated risk report to the client. The client can display the risk report.

Further, the risk report can be displayed in a visual way, such as in a form of a list, or in a form of a chart, etc., so that the risk report can be presented more intuitively.

Optionally, a data module can be set for the client, and the risk report can be stored in the data module, so that the user can also access to historical risk reports while read the current risk report.

With the method for determining a risk level of an instance on a cloud server according to the embodiments of the present disclosure, the risk report of the instance to be monitored is generated based on the risk level, and the risk report is displayed it in a set manner, which effectively optimizes the user experience.

Figure 7:
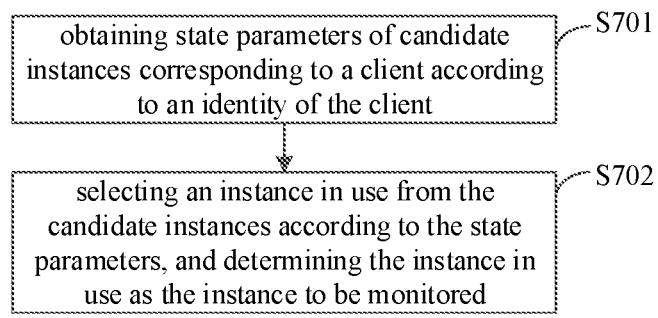
FIG. 7 is a flowchart illustrating a method for determining a risk level of an instance on a cloud server according to an embodiment of the present disclosure.

In some embodiments, the determination of the instance to be monitored can be further described with reference to FIG. 7. FIG. 7 is a flowchart illustrating a method for determining a risk level of an instance on a cloud server according to an embodiment of the present disclosure. As illustrated in FIG. 7, the method includes the following steps.

S701, state parameters of candidate instances corresponding to a client are obtained according to an identity of the client.

In an implementation, there are multiple instances on the cloud server. In order to ensure the efficiency of the risk level determination for the instances, the server can screen all the instances, to obtain the instance to be monitored that requires risk monitoring.

Optionally, the selection can be performed based on the states of the instances.

The server can obtain the candidate instances corresponding to the client according to the identification of the client. That is, according to the identification information of the client, instances that can be used by the user can be determined, and these instances can be determined as the candidate instances.

Optionally, the server may obtain the candidate instances from an instance data interface based on the client's identification information.

Further, the state parameters of the candidate instances can be determined based on attribute information of the candidate instances. The state parameters may include in-use, disabled, and the like.

Optionally, the server may obtain the attribute information of the candidate instances from an instance parameter data interface, and then determine the state parameters of the candidate instances.

S702, an instance in use is selected from the candidate instances according to the state parameters, and the instance in use is determined as the instance to be monitored.

In some embodiments of the present disclosure, an instance on the cloud server being in an disabled state refers to that the instance in this state is unable to provide normal services for the user. Therefore, the risk monitoring may be performed on the instances that can provide normal services for the users.

Optionally, a filtering rule can be determined in advance based on a screening criteria of the state parameters of the instances to be monitored, and the filtering rule can be stored in a set position.

Further, after obtaining the state parameters of all the candidate instances, the filtering rule can be called, and the candidate instances in the in-use state are selected from all the candidate instances based on the filtering rule. The selected candidate instances are determined as the instances to be monitored that require risk monitoring.

For example, a state of candidate instance X is disabled, a state of candidate instance Y is in-use, and a state of candidate instance Z is in-use. Based on the filtering rule, candidate instance Y and candidate instance Z can be determined as the instances to be monitored that require risk monitoring.

With the method for determining a risk level of an instance on a cloud server according to embodiments of the present disclosure, the instance to be monitored that needs risk monitoring is determined according to the state parameters of the candidate instances, which reduces the range of risk monitoring and effectively improves the efficiency of determining the risk level of the instances on the cloud server.

Figure 8:
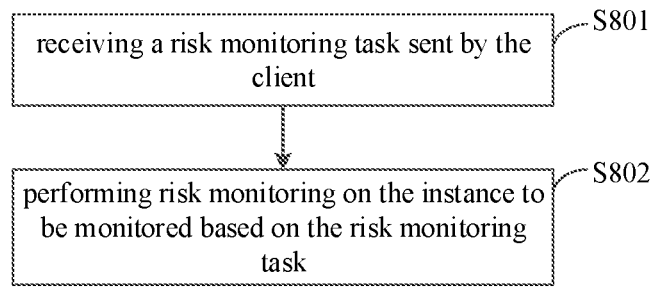
FIG. 8 is a flowchart illustrating a method for determining a risk level of an instance on a cloud server according to an embodiment of the present disclosure.

In some embodiments, a server can perform the risk monitoring on an instance to be monitored based on an instruction of a client, which can be described with reference to FIG. 8. FIG. 8 is a flowchart illustrating a method for determining a risk level of an instance on a cloud server according to an embodiment of the present disclosure. As illustrated in FIG. 8, the method includes the following steps.

S801, a risk monitoring task sent by the client is received.

In some embodiments of the present disclosure, the server may perform risk monitoring on the instances on the cloud server based on a set frequency. The set frequency of the risk monitoring may be obtained through the risk monitoring task sent by the client.

Optionally, a user may send the risk monitoring task to the server through the client. The risk monitoring task may be generated based on a risk monitoring frequency set by the user.

Optionally, the user can send a risk monitoring task to the server through the client based on a set time point.

S802, risk monitoring is performed on the instance to be monitored based on the risk monitoring task.

Further, the server may perform the risk monitoring on the instance to be monitored based on the received risk monitoring task.

Optionally, after the server receives a risk monitoring task generated based on the set frequency, the server can extract the set frequency for performing the risk monitoring, and then the server can implement autonomous risk monitoring on the instance to be monitored based on the frequency.

Optionally, after receiving a risk monitoring task generated based on a set time point, the server extracts the set risk monitoring time (the set time point) in the risk monitoring task, and performs the risk monitoring on the instance to be monitored based on the set time point.

With the method for determining a risk level of an instance on a cloud server according to embodiments of the present disclosure, autonomous monitoring on the instance to be monitored can be implemented based on the set time point or the set frequency in the risk monitoring task, which effectively improves the timeliness of risk level acquisition.

Figure 9:
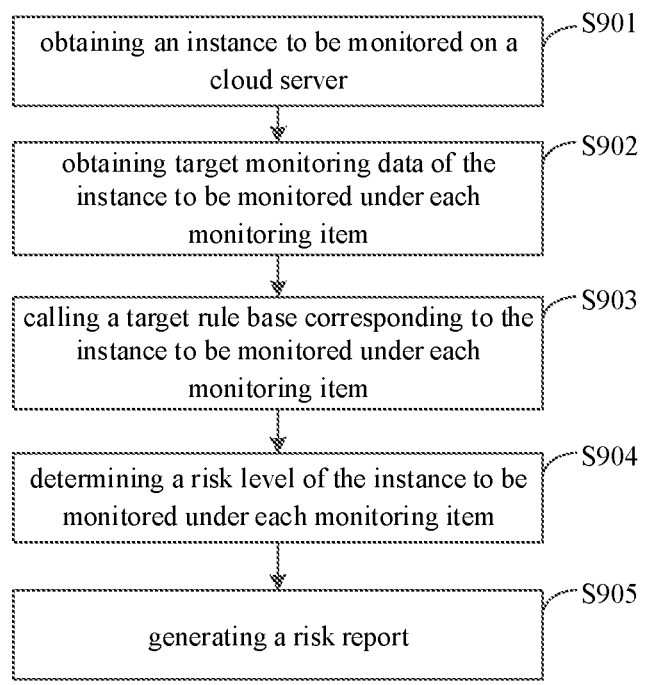
FIG. 9 is a flowchart illustrating a method for determining a risk level of an instance on a cloud server according to an embodiment of the present disclosure.

Further, for a better understanding of the above embodiments, description is made with reference to FIG. 9. FIG. 9 is a flowchart illustrating a method for determining a risk level of an instance on a cloud server according to an embodiment of the present disclosure. As illustrated in FIG. 9, the method includes the following steps.

S901, an instance to be monitored on a cloud server is obtained.

S902, target monitoring data of the instance to be monitored under each monitoring item is obtained.

S903, a target rule base corresponding to the instance to be monitored under each monitoring item is called.

S904, a target risk level of the instance to be monitored under each monitoring item is determined.

S905, a risk report is generated.

After determining the instance to be monitored that needs risk monitoring on the cloud server, the target monitoring data of the instance to be monitored under each monitoring item can be obtained based on set monitoring items. Further, the predefined target rule base corresponding to the instance to be monitored under each monitoring item is called, and the target risk level of the instance to be monitored under each monitoring item is determined based on the target monitoring data and target rule base under each monitoring item.

In the above embodiments of the disclosure, the first risk level is higher than the second risk level.

Figure 10:
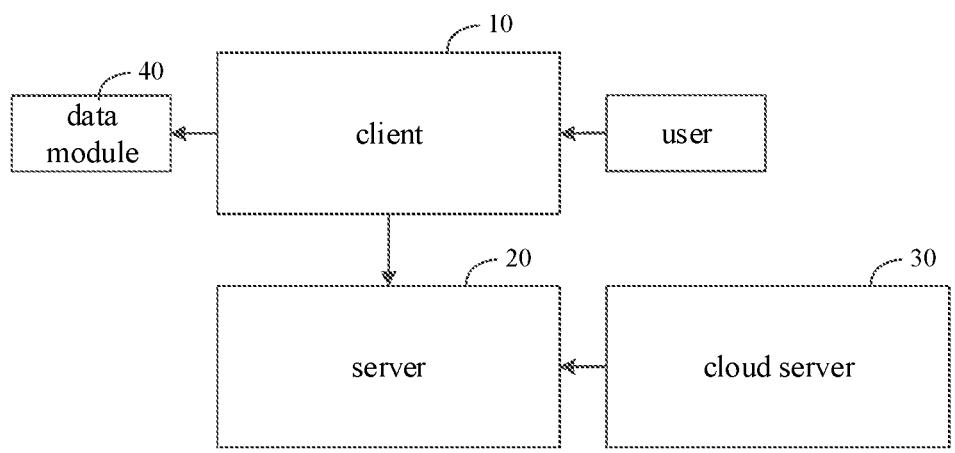
FIG. 10 is a schematic diagram illustrating a system for determining a risk level of an instance on a cloud server according to an embodiment of the present disclosure.

Further, FIG. 10 is a schematic diagram illustrating a system for determining a risk level of an instance on a cloud server according to an embodiment of the present disclosure. Based on the system illustrated in FIG. 10, a method for determining a risk level of an instance on a cloud server according to an embodiment of the disclosure may include following.

A user generates a risk monitoring task through a client 10. The client 10 sends the risk monitoring task to a server 20. The server 20 performs risk level monitoring on an instance on a cloud server 30 based on the obtained risk monitoring task, and obtains a target risk level, under each monitoring item, of an instance to be monitored on the cloud server 30. After that, a corresponding risk report can be generated and sent to the client 10. Optionally, the target risk level may be sent to the client 10, the client 10 generates a corresponding risk report, and the risk report is displayed to the user through the client 10.

The generated risk report can be stored in a data module 40, so as to realize the retrieval of the historical risk reports by the user.

In the present disclosure, risk monitoring can be performed on the instances on the cloud server based on a set frequency, enabling autonomous risk monitoring on the instances on the cloud server, enhancing the timeliness of risk monitoring. In addition, multiple monitoring items are set, and the target risk level of the instance to be monitored under each monitoring item is obtained, thus optimizing the comprehensiveness of risk monitoring for instances on the cloud server.

Corresponding to the method for determining a risk level of an instance on a cloud server according to the above-mentioned embodiments, an embodiment of the present disclosure also provides an apparatus for determining a risk level of an instance on a cloud server. The apparatus for determining a risk level of an instance on a cloud server corresponds to the method for determining a risk level of an instance on a cloud server provided by the above-mentioned several embodiments. Therefore, the above-mentioned embodiments of the method for determining a risk level of an instance on a cloud server are also suitable for the implementation of the apparatus for determining a risk level of an instance on a cloud server provided by embodiments of the present disclosure, which will not be described in detail in the following embodiments.

Figure 11:
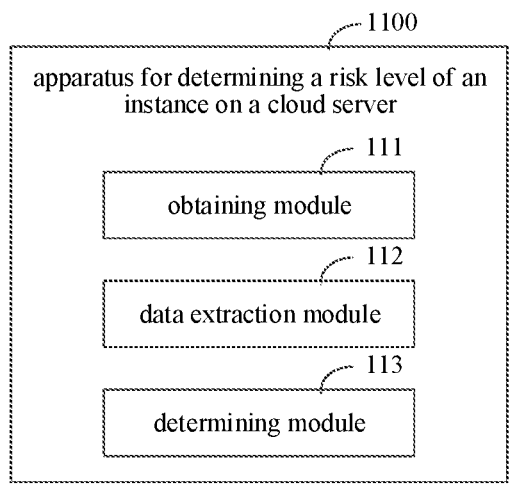
FIG. 11 is a block diagram illustrating an apparatus for determining a risk level of an instance on a cloud server according to an embodiment of the present disclosure.

FIG. 11 is a block diagram illustrating an apparatus for determining a risk level of an instance on a cloud server according to an embodiment of the present disclosure. As illustrated in FIG. 11, the apparatus 1100 for determining a risk level of an instance on a cloud server includes an obtaining module 111, a data extraction module 112, and a determining module 113.

The obtaining module 111 is configured to obtain one or more monitoring items of an instance to be monitored and a rule base of each monitoring item.

The data extraction module 112 is configured to obtain monitoring data corresponding to each monitoring item of the instance to be monitored.

The determining module 113 is configured to determine a risk level of the instance to be monitored under each monitoring item based on the rule base and the monitoring data of each monitoring item.

Figure 12:
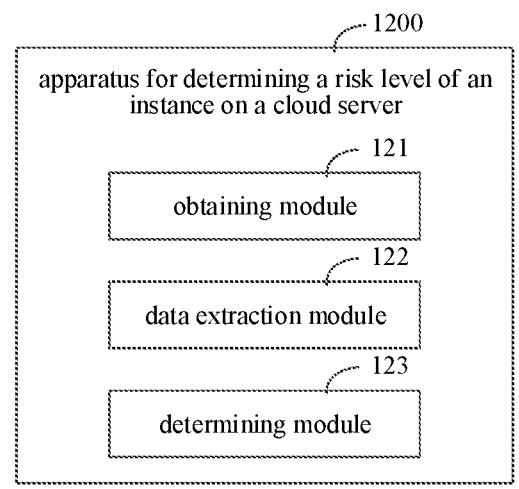
FIG. 12 is a block diagram illustrating an apparatus for determining a risk level of an instance on a cloud server according to an embodiment of the present disclosure.

FIG. 12 is a block diagram illustrating an apparatus for determining a risk level of an instance on a cloud server according to an embodiment of the present disclosure. As illustrated in FIG. 12, the apparatus 1200 for determining a risk level of an instance on a cloud server includes an obtaining module 121, a data extraction module 122, and a determining module 123.

It should be noted that the obtaining module 111, the data extraction module 112, and the determining module 113 respectively have the same structure and function as the obtaining module 121, the data extraction module 122, and the determining module 123.

In some embodiments of the disclosure, the determining module 123 is further configured to: obtain an abnormality identification rule of each type of monitoring sub-data in the monitoring data from the rule base; identify a type of monitoring sub-data satisfying the abnormality identification rule; and determine the risk level of the instance to be monitored under each monitoring item based on the type of monitoring sub-data satisfying the abnormality identification rule.

In some embodiments of the disclosure, the determining module 123 is further configured to: obtain login monitoring data of the instance to be monitored, the login monitoring data including a login IP address and a login frequency of the instance to be monitored; obtaining login monitoring sub-data satisfying respective abnormality identification rules of the login IP address and the login frequency in the login IP address and the login frequency; and determine the risk level of the instance to be monitored under the login monitoring item based on the login monitoring sub-data.

In some embodiments of the disclosure, the determining module 123 is further configured to: determine the risk level of the instance to be monitored under the login monitoring item as a first risk level in response to the login IP address containing a login IP address different from a historical secure login IP address; and determine the risk level of the instance to be monitored under the login monitoring item as the first risk level in response to the login frequency being greater than or equal to a frequency threshold and in response to a successful login; or determine the risk level of the instance to be monitored under the login monitoring item as a second risk level in response to the login frequency being greater than or equal to the frequency threshold and in response to a failed login. The first risk level is higher than the second risk level.

In some embodiments of the disclosure, the determining module 123 is further configured to: obtain authority monitoring data of the instance to be monitored, the authority monitoring data including a plurality of authority permission items of the instance to be monitored; obtain an abnormal authority permission item satisfying an abnormality authority identification rule in the plurality of authority permission items; and determine the risk level of the instance to be monitored under the authority monitoring item based on the abnormal authority permission item.

In some embodiments of the disclosure, the determining module 123 is further configured to: determine the risk level of the instance to be monitored under the authority monitoring item as a first risk level in response to the abnormal authority permission item not being in an authority setting whitelist; determine the risk level of the instance to be monitored under the authority monitoring item as a second risk level in response to the abnormal authority permission item being in the authority setting whitelist; and determine the risk level of the instance to be monitored under the authority monitoring item as the second risk level in response to the abnormal authority permission item being in the authority setting whitelist and a number of the abnormal authority permission item being greater than or equal to a number threshold.

In some embodiments of the disclosure, the determining module 123 is further configured to: obtain security plug-in monitoring data of the instance to be monitored, the security plug-in monitoring data including states of security plug-ins of the instance to be monitored; and determine the risk level of the instance to be monitored under the plug-in monitoring item as a second risk level in response to an unopened state in the states of the security plug-ins.

In some embodiments of the disclosure, the obtaining module 121 is further configured to: obtain state parameters of candidate instances corresponding to a client according to an identity of the client; and select an instance in use from the candidate instances according to the state parameters, and determine the instance in use as the instance to be monitored.

In some embodiments of the disclosure, the obtaining module 121 is further configured to: receive a risk monitoring task sent by the client; and perform risk monitoring on the instance to be monitored based on the risk monitoring task.

In some embodiments of the disclosure, the determining module 123 is further configured to: send the risk level to the client, the risk level being used to generate a risk report of the instance to be monitored at the client; or, generate the risk report based on the risk level, and sending the risk report to the client.

With the apparatus for determining a risk level of an instance on a cloud server according to embodiments of the present disclosure, the one or more monitoring items of the instance to be monitored and the rule base corresponding to each monitoring item are obtained, and the monitoring of the instance to be monitored under each monitoring item is obtained, then, the risk level of the instance to be monitored under each monitoring item is determined according to the monitoring data and the rule base under each monitoring item. In the present disclosure, the risk monitoring can be performed on the instances on the cloud server based on a set frequency, which realizes autonomous risk monitoring on the instances on the cloud server, strengthens the timeliness of the risk monitoring. In addition, by setting multiple monitoring items and obtaining the risk level of the instance to be monitored under each monitoring item, the comprehensiveness of risk monitoring for the instances on the cloud server is optimized.

In the technical solution of the present disclosure, the collection, storage, use, processing, transmission, provision and disclosure of the user's personal information involved are all carried out under the premise of obtaining the user's consent, and all comply with relevant laws and regulations, and do not violate public orders and good customs.

According to the embodiments of the disclosure, an electronic device, a readable storage medium and a computer program product are further provided in the disclosure.

Figure 13:
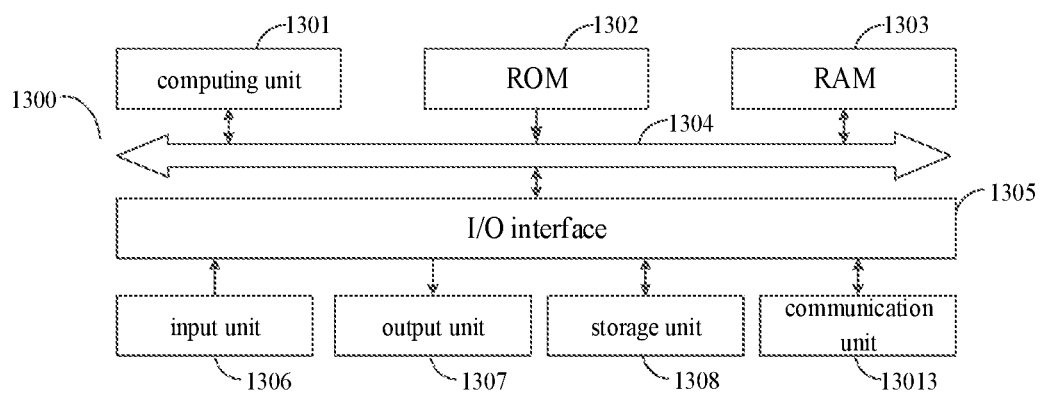
FIG. 13 is a schematic diagram illustrating an electronic device according to an embodiment of the present disclosure.

FIG. 13 is a schematic diagram illustrating an electronic device 1300 according to an embodiment of the present disclosure. The electronic device is intended to represent various types of digital computers, such as laptop computers, desktop computers, workstations, personal digital assistants, servers, blade servers, mainframe computers, and other suitable computers. An electronic device may also represent various types of mobile apparatuses, such as personal digital assistants, cellular phones, smart phones, wearable devices, and other similar computing devices. The components shown herein, their connections and relations, and their functions are merely examples, and are not intended to limit the implementation of the disclosure described and/or required herein.

As illustrated in FIG. 13, a device 1300 includes a computing unit 1301, which may be configured to execute various appropriate actions and processes according to a computer program stored in a read-only memory (ROM) 1302 or loaded from a storage unit 1308 to a random access memory (RAM) 1303. In the RAM 1303, various programs and data required by an operation of the device 1300 may be further stored. The computing unit 1301, the ROM 1302 and the RAM 1303 may be connected with each other by a bus 1304. An input/output (I/O) interface 1305 is also connected to a bus 1304.

A plurality of components in the device 1300 are connected to the I/O interface 1305, including an input unit 1306, for example, a keyboard, a mouse, etc.; an output unit 1307, for example various types of displays, speakers; the storage unit 1308, for example a magnetic disk, an optical disk; and a communication unit 1309, for example, a network card, a modem, a wireless transceiver. The communication unit 1309 allows the device 1300 to exchange information/data through a computer network such as internet and/or various types of telecommunication networks and other devices.

The computing unit 1301 may be various types of general and/or dedicated processing components with processing and computing ability. Some examples of the computing unit 1301 include but not limited to a central processing unit (CPU), a graphics processing unit (GPU), various dedicated artificial intelligence (AI) computing chips, various computing units running a machine learning model algorithm, a digital signal processor (DSP), and any appropriate processor, controller, microcontroller, etc. The computing unit 1301 performs various methods and processing as described above, for example, a method for determining a risk level of an instance on a cloud server. For example, in some embodiments, a method for determining a risk level of an instance on a cloud server may be further achieved as a computer software program, which is physically contained in a machine readable medium, such as the storage unit 1308. In some embodiments, a part or all of the computer program may be loaded and/or installed on the device 1300 via a ROM 1302 and/or a communication unit 1309. When the computer program is loaded on the RAM 1303 and performed by the computing unit 1301, one or more steps in the above method for determining a risk level of an instance on a cloud server may be performed. Alternatively, in other embodiments, the computing unit 1301 may be configured to perform a method for determining a risk level of an instance on a cloud server in other appropriate ways (for example, by virtue of a firmware).

Various implementation modes of systems and technologies described herein may be implemented in a digital electronic circuit system, an integrated circuit system, a field programmable gate array (FPGA), a dedicated application specific integrated circuit (ASIC), an application specific standard product (ASSP), a system on a chip (SoC), a complex programmable logic device (CPLD), a computer hardware, a firmware, a software, and/or combinations thereof. The various implementation modes may include: being implemented in one or more computer programs, and the one or more computer programs may be executed and/or interpreted on a programmable system including at least one programmable processor, and the programmable processor may be a dedicated or a general-purpose programmable processor that may receive data and instructions from a storage system, at least one input apparatus, and at least one output apparatus, and transmit the data and instructions to the storage system, the at least one input apparatus, and the at least one output apparatus.

A computer code configured to execute a method in the present disclosure may be written with one or any combination of a plurality of programming languages. The programming languages may be provided to a processor or a controller of a general purpose computer, a dedicated computer, or other apparatuses for programmable data processing so that the function/operation specified in the flowchart and/or block diagram may be performed when the program code is executed by the processor or controller. A computer code may be performed completely or partly on the machine, performed partly on the machine as an independent software package and performed partly or completely on the remote machine or server.

In the context of the disclosure, a machine-readable medium may be a tangible medium that may contain or store a program intended for use in or in conjunction with an instruction execution system, apparatus, or device. A machine readable medium may be a machine readable signal medium or a machine readable storage medium. A machine readable storage medium may include but not limited to an electronic, magnetic, optical, electromagnetic, infrared, or semiconductor system, apparatus or device, or any appropriate combination thereof. A more specific example of a machine readable storage medium includes an electronic connector with one or more cables, a portable computer disk, a hardware, a random access memory (RAM), a read-only memory (ROM), an electrically programmable read-only memory (an EPROM or a flash memory), an optical fiber device, and a compact disc read-only memory (CD-ROM), an optical storage device, a magnetic storage device, or any appropriate combination thereof.

In order to provide interaction with the user, the systems and technologies described here may be implemented on a computer, and the computer has: a display apparatus for displaying information to the user (for example, a cathode ray tube (CRT) or a liquid crystal display (LCD) monitor); and a keyboard and a pointing apparatus (for example, a mouse or a trackball) through which the user may provide input to the computer. Other types of apparatuses may be further configured to provide interaction with the user; for example, the feedback provided to the user may be any form of sensory feedback (for example, visual feedback, auditory feedback, or tactile feedback); and input from the user may be received in any form (including an acoustic input, a voice input, or a tactile input).

The systems and technologies described herein may be implemented in a computing system including back-end components (for example, as a data server), or a computing system including middleware components (for example, an application server), or a computing system including front-end components (for example, a user computer with a graphical user interface or a web browser through which the user may interact with the implementation mode of the system and technology described herein), or a computing system including any combination of such back-end components, middleware components or front-end components. The system components may be connected to each other through any form or medium of digital data communication (for example, a communication network). The examples of a communication network include a local area network (LAN), a wide area network (WAN), an internet and a blockchain network.

The computer system may include a client and a server. The client and the server are generally far away from each other and generally interact with each other through a communication network. The relationship between the client and the server is generated by computer programs running on the corresponding computer and having a client-server relationship with each other. The server may be a cloud server, servers of a distributed system, or a server combined with a blockchain.

It should be understood that, various forms of procedures shown above may be configured to reorder, add or delete blocks. For example, blocks described in the disclosure may be performed in parallel, sequentially, or in a different order, as long as the desired result of the technical solution disclosed in the present disclosure may be achieved, which will not be limited herein.

The above specific implementations do not constitute a limitation on the protection scope of the disclosure. Those skilled in the art should understand that various modifications, combinations, sub-combinations and substitutions may be made according to design requirements and other factors. Any modification, equivalent replacement, improvement, etc., made within the spirit and principle of embodiments of the present disclosure shall be included within the protection scope of the present disclosure.

What is claimed is:

1. A method for determining a risk level of an instance on a cloud server, comprising:
    obtaining one or more monitoring items of an instance to be monitored and a rule base of each monitoring item;
    obtaining monitoring data corresponding to each monitoring item of the instance to be monitored; and
    determining a risk level of the instance to be monitored under each monitoring item based on the rule base and the monitoring data of each monitoring item,
    wherein the method further comprises: obtaining state parameters of candidate instances corresponding to a client according to an identity of the client, wherein the cloud server comprises a plurality of instances, the candidate instances are instances of the plurality of instances of the cloud server that can be used by a user, and the state parameters comprises in-use and disabled; and selecting an instance in use from the candidate instances according to the state parameters, and determining the instance in use as the instance to be monitored;
    wherein the method is performed by the cloud server;
    wherein the method further comprises: sending the risk level to the client,
    wherein the risk level is used to generate a risk report of the instance to be monitored at the client; and wherein the risk report is displayed to the user through the client.

2. The method as claimed in claim 1, wherein determining the risk level of the instance to be monitored under each monitoring item based on the rule base and the monitoring data of each monitoring item comprises:
    obtaining an abnormality identification rule of each type of monitoring sub-data in the monitoring data from the rule base;
    identifying a type of monitoring sub-data satisfying the abnormality identification rule; and
    determining the risk level of the instance to be monitored under each monitoring item based on the type of monitoring sub-data satisfying the abnormality identification rule.

3. The method as claimed in claim 2, wherein the one or more monitoring items comprise a login monitoring item, and determining a risk level of the instance to be monitored under the login monitoring item comprises:
    obtaining login monitoring data of the instance to be monitored, wherein the login monitoring data comprises a login IP address and a login frequency of the instance to be monitored;
    obtaining first login monitoring sub-data satisfying an abnormality identification rule of a login-IP-address type in the login IP address, and obtaining second login monitoring sub-data satisfying an abnormality identification rule of a login-frequency type in the login frequency; and
    determining the risk level of the instance to be monitored under the login monitoring item based on the first login monitoring sub-data and the second login monitoring sub-data.

4. The method as claimed in claim 3, wherein determining the risk level of the instance to be monitored under the login monitoring item based on the first login monitoring sub-data and the second login monitoring sub-data comprises:
    determining the risk level of the instance to be monitored under the login monitoring item as a first risk level in response to the login IP address containing a login IP address different from a historical secure login IP address; and
    determining the risk level of the instance to be monitored under the login monitoring item as the first risk level in response to the login frequency greater than or equal to a frequency threshold and in response to a successful login; or
    determining the risk level of the instance to be monitored under the login monitoring item as a second risk level in response to the login frequency greater than or equal to the frequency threshold and in response to a failed login;
    wherein the first risk level is higher than the second risk level.

5. The method as claimed in claim 2, wherein the one or more monitoring items comprise an authority monitoring item, and determining a risk level of the instance to be monitored under the authority monitoring item comprises:
    obtaining authority monitoring data of the instance to be monitored, wherein the authority monitoring data comprises a plurality of authority permission items of the instance to be monitored;
    obtaining an abnormal authority permission item satisfying an abnormality authority identification rule in the plurality of authority permission items; and
    determining the risk level of the instance to be monitored under the authority monitoring item based on the abnormal authority permission item.

6. The method as claimed in claim 5, wherein determining the risk level of the instance to be monitored under the authority monitoring item based on the abnormal authority permission item comprises:
 determining the risk level of the instance to be monitored under the authority monitoring item as a first risk level in response to the abnormal authority permission item not in an authority setting whitelist;
 determining the risk level of the instance to be monitored under the authority monitoring item as a second risk level in response to the abnormal authority permission item in the authority setting whitelist; and
 determining the risk level of the instance to be monitored under the authority monitoring item as the second risk level in response to the abnormal authority permission item in the authority setting whitelist and a number of the abnormal authority permission item being greater than or equal to a number threshold.

7. The method as claimed in claim 2, wherein the one or more monitoring items comprise a plug-in monitoring item, and determining a risk level of the instance to be monitored under the plug-in monitoring item comprises:
 obtaining security plug-in monitoring data of the instance to be monitored, wherein the security plug-in monitoring data comprises states of security plug-ins of the instance to be monitored; and
 determining the risk level of the instance to be monitored under the plug-in monitoring item as a second risk level in response to an unopened state in the states of the security plug-ins.

8. The method as claimed in claim 1, further comprising:
 receiving a risk monitoring task sent by the client; and
 performing risk monitoring on the instance to be monitored based on the risk monitoring task.

9. The method as claimed in claim 8, further comprising:
 generating the risk report based on the risk level, and sending the risk report to the client.

10. An electronic device for a cloud server, comprising:
 at least one processor; and
 a memory communicatively connected to the at least one processor; wherein,
 the memory is stored with instructions executable by the at least one processor, when the instructions are performed by the at least one processor, the at least one processor is caused to perform a method for determining a risk level of an instance on the cloud server, the method comprising:
 obtaining one or more monitoring items of an instance to be monitored and a rule base of each monitoring item;
 obtaining monitoring data corresponding to each monitoring item of the instance to be monitored; and
 determining a risk level of the instance to be monitored under each monitoring item based on the rule base and the monitoring data of each monitoring item,
 wherein the method further comprises: obtaining state parameters of candidate instances corresponding to a client according to an identity of the client, wherein the cloud server comprises a plurality of instances, the candidate instances are instances of the plurality of instances of the cloud server used by a user, and the state parameters comprises in-use and disabled; and
 selecting an instance in use from the candidate instances according to the state parameters, and determining the instance in use as the instance to be monitored;
 wherein the method further comprises: sending the risk level to the client, wherein the risk level is used to generate a risk report of the instance to be monitored at the client; and
 wherein the risk report is displayed to the user through the client.

11. The electronic device as claimed in claim 10, wherein determining the risk level of the instance to be monitored under each monitoring item based on the rule base and the monitoring data of each monitoring item comprises:
 obtaining an abnormality identification rule of each type of monitoring sub-data in the monitoring data from the rule base;
 identifying a type of monitoring sub-data satisfying the abnormality identification rule; and
 determining the risk level of the instance to be monitored under each monitoring item based on the type of monitoring sub-data satisfying the abnormality identification rule.

12. The electronic device as claimed in claim 11, wherein the one or more monitoring items comprise a login monitoring item, and determining a risk level of the instance to be monitored under the login monitoring item comprises:
 obtaining login monitoring data of the instance to be monitored, wherein the login monitoring data comprises a login IP address and a login frequency of the instance to be monitored;
 obtaining first login monitoring sub-data satisfying an abnormality identification rule of a login-IP-address type in the login IP address, and obtaining second login monitoring sub-data satisfying an abnormality identification rule of a login-frequency type in the login frequency; and
 determining the risk level of the instance to be monitored under the login monitoring item based on the first login monitoring sub-data and the second login monitoring sub-data.

13. The electronic device as claimed in claim 12, wherein determining the risk level of the instance to be monitored under the login monitoring item based on the first login monitoring sub-data and the second login monitoring sub-data comprises:
 determining the risk level of the instance to be monitored under the login monitoring item as a first risk level in response to the login IP address containing a login IP address different from a historical secure login IP address; and
 determining the risk level of the instance to be monitored under the login monitoring item as the first risk level in response to the login frequency greater than or equal to a frequency threshold and in response to a successful login; or determining the risk level of the instance to be monitored under the login monitoring item as a second risk level in response to the login frequency greater than or equal to the frequency threshold and in response to a failed login; wherein the first risk level is higher than the second risk level.

14. The electronic device as claimed in claim 11, wherein the one or more monitoring items comprise an authority monitoring item, and determining a risk level of the instance to be monitored under the authority monitoring item comprises:
 obtaining authority monitoring data of the instance to be monitored, wherein the authority monitoring data comprises a plurality of authority permission items of the instance to be monitored;

obtaining an abnormal authority permission item satisfying an abnormality authority identification rule in the plurality of authority permission items; and determining the risk level of the instance to be monitored under the authority monitoring item based on the abnormal authority permission item.

15. The electronic device as claimed in claim 14, wherein determining the risk level of the instance to be monitored under the authority monitoring item based on the abnormal authority permission item comprises:

determining the risk level of the instance to be monitored under the authority monitoring item as a first risk level in response to the abnormal authority permission item not being in an authority setting whitelist;

determining the risk level of the instance to be monitored under the authority monitoring item as a second risk level in response to the abnormal authority permission item in the authority setting whitelist; and determining the risk level of the instance to be monitored under the authority monitoring item as the second risk level in response to the abnormal authority permission item being in the authority setting whitelist and a number of the abnormal authority permission item greater than or equal to a number threshold.

16. The electronic device as claimed in claim 11, wherein the one or more monitoring items comprise a plug-in monitoring item, and determining a risk level of the instance to be monitored under the plug-in monitoring item comprises:

obtaining security plug-in monitoring data of the instance to be monitored, wherein the security plug-in monitoring data comprises states of security plug-ins of the instance to be monitored; and determining the risk level of the instance to be monitored under the plug-in monitoring item as a second risk level in response to an unopened state in the states of the security plug-ins.

17. The electronic device as claimed in claim 10, wherein the method further comprises: receiving a risk monitoring task sent by the client; and performing risk monitoring on the instance to be monitored based on the risk monitoring task.

18. A non-transitory computer readable storage medium stored with computer instructions for a cloud server, wherein, the computer instructions are configured to cause a computer to perform a method for determining a risk level of an instance on the cloud server, the method comprising:

obtaining one or more monitoring items of an instance to be monitored and a rule base of each monitoring item;

obtaining monitoring data corresponding to each monitoring item of the instance to be monitored; and determining a risk level of the instance to be monitored under each monitoring item based on the rule base and the monitoring data of each monitoring item, wherein the method further comprises: obtaining state parameters of candidate instances corresponding to a client according to an identity of the client, wherein the cloud server comprises a plurality of instances, the candidate instances are instances of the plurality of instances of the cloud server used by a user, and the state parameters comprises in-use and disabled; and selecting an instance in use from the candidate instances according to the state parameters, and determining the instance in use as the instance to be monitored;

wherein the method further comprises: sending the risk level to the client, wherein the risk level is used to generate a risk report of the instance to be monitored at the client; and wherein the risk report is displayed to the user through the client.

* * * * *